(12) United States Patent
Waters et al.

(10) Patent No.: US 9,152,629 B1
(45) Date of Patent: Oct. 6, 2015

(54) ELECTRONIC BOOK SIGNING SYSTEM AND METHOD

(75) Inventors: Thomas J. Waters, St. Petersburg, FL (US); Robert N. Barrett, Huntsville, AL (US)

(73) Assignee: Autography, LLC, St. Petersburg, FL (US)

( * ) Notice: Subject to any disclaimer, the term of this patent is extended or adjusted under 35 U.S.C. 154(b) by 695 days.

(21) Appl. No.: 13/165,390

(22) Filed: Jun. 21, 2011

Related U.S. Application Data

(60) Provisional application No. 61/356,688, filed on Jun. 21, 2010.

(51) Int. Cl.
*G06F 17/30* (2006.01)

(52) U.S. Cl.
CPC ............................... *G06F 17/30011* (2013.01)

(58) Field of Classification Search
CPC ............... G06F 17/30011; G06F 17/30017
USPC ................. 707/736, 756, 790, 802, 803, 804; 382/115, 119–123
See application file for complete search history.

(56) References Cited

U.S. PATENT DOCUMENTS

| | | | |
|---|---|---|---|
| 5,694,334 A | 12/1997 | Donahue et al. | |
| 5,727,156 A | 3/1998 | Herr-Hoyman et al. | |
| 5,790,937 A | 8/1998 | Gutle | |
| 5,818,435 A | 10/1998 | Kozuka et al. | |
| 6,473,073 B1 | 10/2002 | Fleck | |
| 6,689,965 B1 | 2/2004 | Fleck | |
| 6,907,131 B2 | 6/2005 | Verhoeven et al. | |
| 7,046,828 B1* | 5/2006 | Gibbs et al. | 382/119 |
| 7,697,713 B1 | 4/2010 | Verhoeven et al. | |
| 7,917,761 B2* | 3/2011 | Cahill et al. | 713/176 |
| 8,478,662 B1 | 7/2013 | Snodgrass et al. | |
| 2004/0203594 A1* | 10/2004 | Kotzin et al. | 455/411 |
| 2005/0251749 A1 | 11/2005 | Lamkin et al. | |
| 2006/0230340 A1 | 10/2006 | Parsons et al. | |

(Continued)

FOREIGN PATENT DOCUMENTS

| | | | |
|---|---|---|---|
| EP | 0740265 B1 | 5/2003 | |
| EP | 0964327 B1 | 9/2004 | |

(Continued)

OTHER PUBLICATIONS

"Autography," downloaded from www.autography.com/index.php/key_features, 1 page.

(Continued)

*Primary Examiner* — Hares Jami
(74) *Attorney, Agent, or Firm* — Shumaker Loop & Kendrick, LLP

(57) ABSTRACT

An electronic personalization system comprises a server, electronic content for use on a personal electronic device capable of providing a tangible medium of expression, and a storage device. The system is capable of coupling the server and the storage medium with the personal electronic device such that a personalized message, such as an image, a video recording, an audio recording or the like, and/or a signature entered by an author, such as a writer, creator, artist or the like, on the personal electronic device or another device, is integrally added to the electronic content. The storage medium may store a copy of personalized electronic content and/or personalization, and the system may validate the personalization as authentic and not counterfeit.

17 Claims, 3 Drawing Sheets

(56) References Cited

U.S. PATENT DOCUMENTS

| | | |
|---|---|---|
| 2007/0089057 A1 | 4/2007 | Kindig |
| 2007/0136672 A1 | 6/2007 | Cooper |
| 2007/0265971 A1* | 11/2007 | Smalley .................. 705/52 |
| 2008/0134043 A1 | 6/2008 | Georgis et al. |
| 2008/0195949 A1 | 8/2008 | Baum et al. |
| 2009/0144615 A1 | 6/2009 | Brown et al. |
| 2009/0151004 A1 | 6/2009 | Cohen et al. |
| 2009/0171750 A1 | 7/2009 | Zhou et al. |
| 2009/0171751 A1 | 7/2009 | Zhou et al. |
| 2009/0319798 A1* | 12/2009 | Ooi et al. .................. 713/186 |
| 2010/0058177 A1 | 3/2010 | Engel et al. |
| 2010/0121763 A1* | 5/2010 | Vasudevan et al. .......... 705/39 |
| 2010/0283766 A1* | 11/2010 | Shieh .................. 345/179 |
| 2010/0284033 A1* | 11/2010 | Popovic et al. .......... 358/1.15 |
| 2011/0050394 A1* | 3/2011 | Zhang et al. .............. 340/5.82 |
| 2011/0157098 A1 | 6/2011 | Liu |
| 2011/0199631 A1* | 8/2011 | Healy .................. 358/1.14 |
| 2011/0294473 A1* | 12/2011 | Subburam .............. 455/414.1 |
| 2012/0030030 A1 | 2/2012 | Flinn et al. |
| 2012/0266076 A1 | 10/2012 | Lockhart et al. |
| 2013/0117665 A1 | 5/2013 | Tagliaferri et al. |
| 2013/0132230 A1 | 5/2013 | Gibson et al. |

FOREIGN PATENT DOCUMENTS

| | | |
|---|---|---|
| WO | 2009/144740 A2 | 12/2009 |
| WO | 2011/151678 A1 | 12/2011 |
| WO | 2012/012894 A1 | 2/2012 |

OTHER PUBLICATIONS

Peter Pachal, "Nook Color to Let Authors Autograph E-Books," PCMag.com, Apr. 26, 2011 downloaded from www.pcmag.com/article2/0,2817,2384309,00.asp.,1 page.

U.S. Appl. No. 13/429,238titled embedding an autograph in an electronic book.

Download from http://southflorida.bizjournals.com/southflorida/stories/2010/06/07daily27.html?surround . . . , Dyadic in deal to license biotechnology, South Florida Businees Journal, Jun. 9, 2010, 3 pages, copyright 2010 American City Business Journals, Inc. and its licensors.

Downloaded from http://www.wacom.sg/casestudy/case/electronic-autographs-national-library-singapore, Electronic Autographs at the National Library, Singapore, 3 pages.

Download from http://www.wacom.com.sg/casestudy/case/stu-500-ceca-spain, STU-500 at CECA Spain, 3 pages.

* cited by examiner

ELECTRONIC BOOK SIGNING SYSTEM AND METHOD

RELATED APPLICATION

This application claims the benefit of the filing date of U.S. Provisional Application No. 61/356,688 filed Jun. 21, 2010, the disclosure of which is hereby incorporated herein by reference in its entirety.

FIELD OF THE INVENTION

The field relates to books distributed by electronic means.

BACKGROUND

Electronic book readers, such as the Kindle® and iPad®, are known that allow books to be distributed digitally.

Authors know the value of book signings for bringing out fans of the author, who purchase their book in order to get a personalized signing of the book by the author. This is often the way that authors help to drive sales of their books.

Electronic book readers do not have a way for authors to personalize the books.

Digitizer systems are known that use pen, stylus or finger as a pointer on a touch pad, screen or digitizing tablet. For example, U.S. Pat. Nos. 6,473,073 and 6,689,965 describe a digitizer system that includes a pointer, such as a stylus or puck, for manipulation by a user over a work surface of a tablet. The position of the pointer on the tablet is indicated by a cursor of some type, and the cursor shape can change depending on functional aspects of operation being performed on the tablet. The digitizer system is used to operate a computer system for text editing or drawing pictures, for example. A menu strip is added to the digitizer screen to reduce the need to look away from the digitizer. The reference teaches that some programs are designed to use stylus pen pressure and position date, such as Fractal Design PAINTER™, and some are not. The Digitizer system does not teach or suggest its use with electronic book readers or any features for use in author personalization of electronic books. European patent publication EP 0 964 327 B1 describes a software routine that can change the shape of the cursor as a function of pointer location on a menu strip and a system for use of a stylus designed for use with this system.

WO 2009/144740 is an international publication of international application no. PCT/IN2009/000290. This application discloses a method and system for obtaining an autographed photograph via a mobile communications network. The user selects the background upon which the autograph of a celebrity will appear, and the user selects the customized text that will appear on the background. The system converts the text to have the appearance of writing and adds the celebrity's autograph, which is stored for this purpose on the system, on the chosen background. The "personalized photograph" is then sent to the user of the system. This system teaches away from obtaining the signature of the celebrity by transmission to the site at which the celebrity is actually present, which is described as cumbersome. This application teaches that the prior art does not reveal any simply implemented method and system for obtaining the autograph of a celebrity when the user is at a location remote from the celebrity. Thus, this application teaches a system that does not require the actual participation of the celebrity in the preparation of a "personalized photograph" including the celebrities autograph.

U.S. Pat. No. 7,697,713 discloses another method and program for distributing, transmitting and producing "personalized" autographed photographs of celebrities. However, the personalized message and autograph merely "resembles the handwriting of the celebrity figure" based on samples of the celebrity's handwriting.

U.S. Pat. Pub. Nos. 2009/0171750 and 2009/0171751 disclose a method of providing fixed computer-displayable content in response to a consumer request for content, which includes an advertisement in print on-demand content, which is then provided to the consumer. In this way, the advertisement is included within the content selected by the consumer, such as by adding the advertisement to the margin of a page in a book or by adding a full page advertisement between two pages in the book. The method primarily discloses print-on-demand technology to provide physically printed content to the consumer. In one embodiment, however, the method does provide an E-book with the generated advertisements within the content of the E-book. The advertisement is stored on the system with metadata to identify the advertisement such that the advertisement may be selected for inclusion within the content requested by the consumer. This publication fails to teach or suggest any personalization of the content by an author or in any other way.

SUMMARY OF THE INVENTION

The invention is an electronic signing system and method, which includes several inventive systems, embodiments and examples. The inventors believe that actual personally autographed E-books hold more value for the reader and will encourage actual purchase of electronic books. However, the system and method is not limited to E-books. Instead, the value of a personalized autograph from a favorite author, celebrity or musician is a powerful motivating influence for actual purchase of the electronic content, rather than merely renting, sharing or purloining the content. Thus, the invention is broader than just the examples provided for E-books and E-book readers and a portion or all of the system has application in a variety of industries.

A problem with E-books is that there is no cover page to physically sign; therefore, an author who wishes to sign an E-book does not have an option to do so, in person or remotely. Authors use book signings to bring readers to bookstores, and these book signings generate many sales of the author's books. The perceived value of an actual personalized copy of a book is much greater than the book, itself, to a reader. In addition, book signings have a residual benefit, long after the signing is over, making a reader a more devoted follower of the author.

For this reason, authors travel the globe to appear for book signings at local venues, where the author can connect with fans, both new readers of the author's work and devoted followers of the author's work. While valuable, this process can be expensive, fatiguing, and an author can only expect to reach a small fraction of his or her total audience. The travel involved in signing tours takes away from the author's time to write.

The system and method is capable of being used in book signing tours for signing E-books, or other purchased content, of consumers. The system and method is capable, also, of remote use, allowing an author the opportunity to meet and sign E-books, or other purchased content, of his or her audience, without traveling around the globe. Therefore, the system and method has the ability of greatly extending the reach of a typical author beyond the book signing tour, allowing the author additional opportunities to meet consumers and potential consumers of the author's works and to personalize copies of the purchased works, individually, for each consumer. Thus, the consumer obtains a unique, personalized copy of the author's work, which is integrated with the consumer's own copy of the electronically distributed work. The consumer can keep the personalized work in the consumer's digital library with the integrated personalization included within the personalized work.

For example, an author of a book distributed electronically can sign a person's copy of an electronic book (E-book) in person, directly on the person's E-book reader.

DETAILED DESCRIPTION OF THE EXAMPLES

Figure 1:
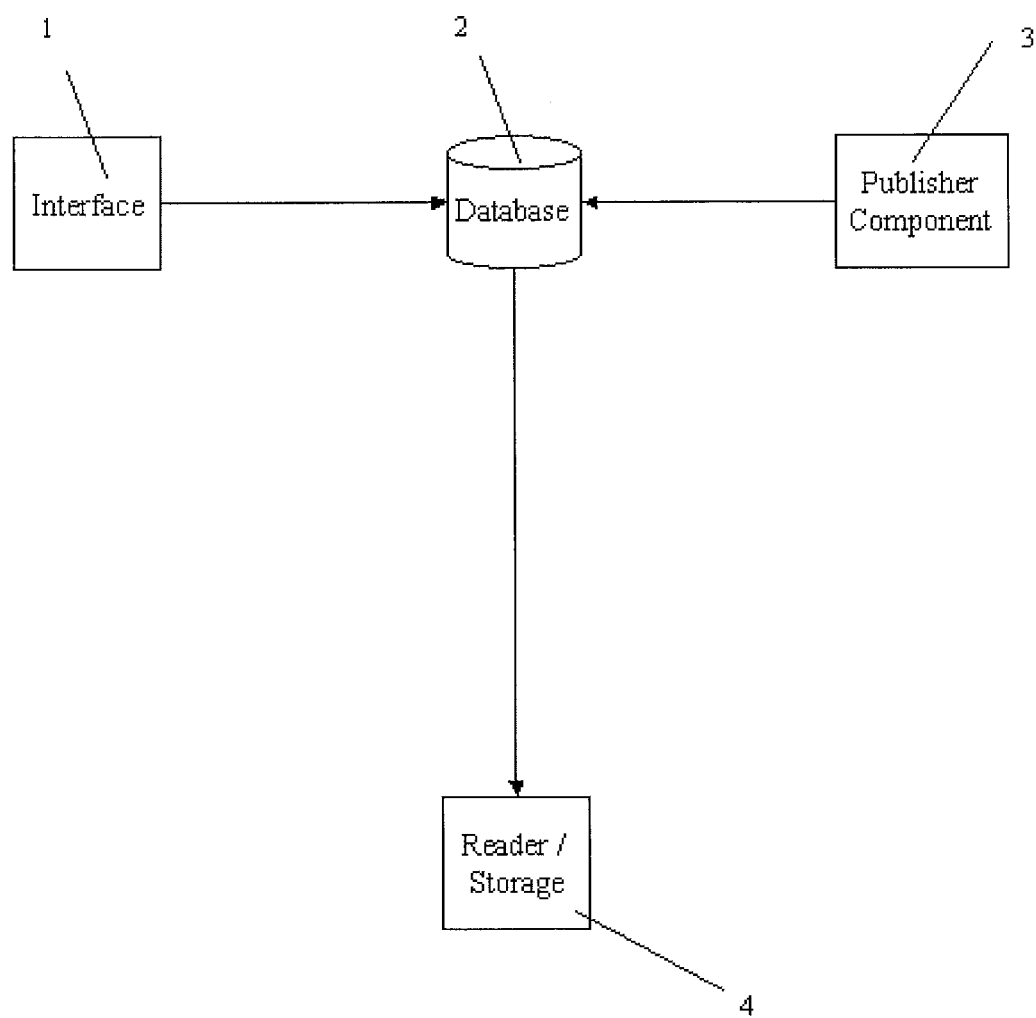
FIG. 1 illustrates one example of a method for an E-book or other electronic media distribution system.

One example of a system uses an input device, such as a stylus or even the author's own finger, to enter a personalized message and autograph (personalization) in the author's own handwriting on a digitizing tablet, screen or pad. The screen may be the screen of an E-book reader or a transparent touch pad may be laid over the screen, if the screen is not a touch sensitive device. Preferably, the personalization may be done on an author's device and the personalization may be inserted into an E-book transferred to the reader's device. Regardless, the system automatically inserts the personalization and signature within the E-book, using any of the known ways of inserting content into E-books. In this way, E-books using proprietary or open formats can be personalized.

In one example, the personalization is automatically backed-up onto a personalization registry. The registry can authenticate the personalization and provides for a convenient method of replacing the personalization in case of loss of the personalized E-book by accident or error.

In one embodiment, the purveyor of the E-book receives the author's actual electronically digitized personalization, which may include a message and the author's signature, and the purveyor of the E-book uses software made available to it to integrate the author's personalization within the reader's E-book, transmitting the personalized E-book to the reader. In an alternative embodiment, the purveyor of the E-book sends the E-book to a third party service, which inserts the personalization in the E-book and returns the E-book to the purveyor for distribution to the reader or authorizes the third party to send the E-book directly to the reader. In yet another alternative embodiment, the purveyor of the E-book authorizes the third party to produce copies of the E-book for the purpose of personalization, and the third party handles the entire personalization method by receiving the personalization, inserting the personalization within a copy of the E-book and transmitting the personalized E-book to the reader.

In one example, payment for the E-book may be shared with the purveyor of the E-book, the author and the third party, based on a formula splitting the payment according to contractual terms, for sales of personalized copies of E-books.

In one example, a registry automatically authenticates the personalization using a verification system, preventing forgeries from entering the registry. Unlike a physical signature on a piece of paper, authentication of a digitally signed personalization that includes an author's autograph can include many additional parameters, such as the pressure applied during signing, the timing of the author's signature and the like. Indeed, the autograph of the author may be used as the author's biometric password in the registry or in addition to a standard, character-based password, because the author's signature can be uniquely authenticated based on timing and pressure parameters recorded by the verification system during signing of the signature by the author. For example, the system for authenticating the author's signature may look at the change in direction of the pointing device over time, and pressure of the pointing device during each stroke and/or change in direction, based on a number of baseline signatures entered by the author in the authentication verification system. A range of values for timing and pressure may be generated, and verification may be based on the author's meeting one or more of these value ranges for timing and pressure.

In one example, a signature must be within the timing and pressure ranges for ninety percent of the threshold ranges identified by the verification system as characteristic of the author's signature.

The number of threshold ranges for timing and pressure and the percentage of threshold ranges to be determined by the verification system's analysis of the author's signature during a set-up routine. In addition, these values and the percentage to achieve for authentication may be updated over time with each new signing, allowing for the inevitable changes that occur over long periods of time in an author's signature. Each new authentication can be used to adjust the threshold and ranges for the values used in authenticating the signature of a particular author, for example, or the verification system may aggregate a large number of signatures prior to updating these values and thresholds.

A series of time intervals may be determined for the author's signature that uniquely identify the signature of the author as his or her own. For example, each time that the direction of the stylus changes direction, i.e. the slope of the derivative goes to zero, may be used as a new timing interval. The pressure of the stylus as the derivative goes to zero may be a second parameter. During set-up for an author, an author may sign a plurality of times to provide a range of values for timing, relative position and pressure, and these timing, relative position and pressure ranges may be stored in a look-up table (LUT). The LUT may be updated from time to time based on additional input from the author. The verification system may reject a signature that does not match the values stored in the LUT, offering the author a limited number of times to sign. In one example, if signature authentication fails, the author may be given an opportunity to enter the system and to update the verification LUT with new samples of the author's signature, if the author's signature changes.

In one example, the system includes a registry that can be used by more than one type of reader. At least ten different book readers are available in the marketplace or are becoming available in the marketplace. In one example, the registry can provide each of the readers with authenticated personalizations from authors, either traveling to signings or from the comfort of the author's own home, office or other location. In one example, the registry may include metadata that shows when, where and under what circumstances the author personalized the work. By keeping this information stored in the registry, the verification system may determine when a forgery is encountered that was not included within an author's itinerary.

FIG. 1 illustrates a method for purchasing a work of authorship. The reader accesses the purchaser Interface 1 and information is sent to a Database 2. The Publisher 3 provides the work of authorship to the database 2, which sends the work of authorship to the purchaser's reader or storage device 4.

Figure 2:
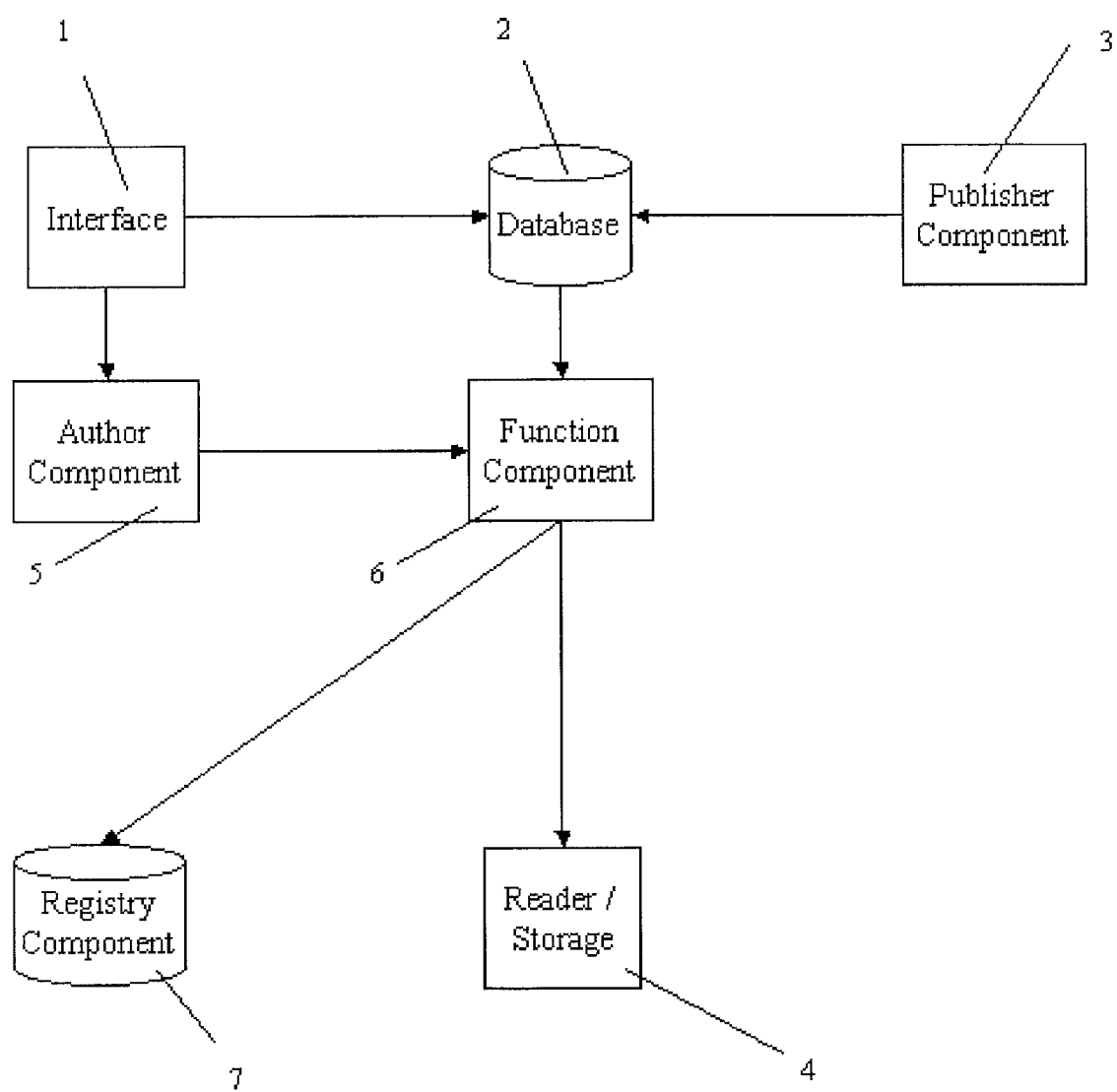
FIG. 2 illustrates one example of a system for a digitally autographed E-book or other electronic media delivery.

In the example of FIG. 2, the system and method causes the Interface 1 to communicate with the Author Component 5, allowing the author to enter a personalized message and autograph, for example. For example, an E-book may be released from the Database 2 according to the system in FIG. 1; however, a Function Component 6, which may be maintained by the registry, for example, integrates the author's personalization entered in the Author Component 5 with the E-book from the Publisher 3 prior to sending the E-book to the reader or storage device 4. The author's personalization and metadata about the personalization may be stored by the registry in the Registry Component 7, for example.

Figure 3:
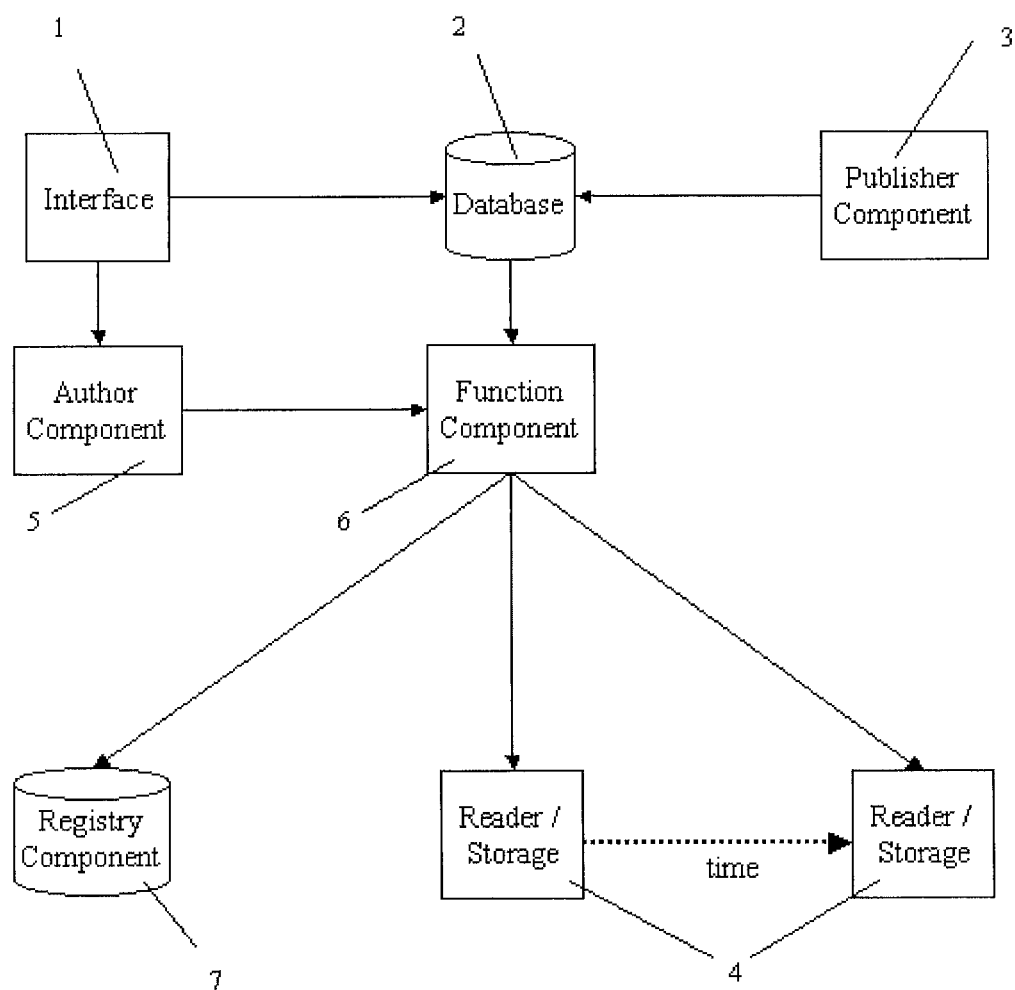
FIG. 3 illustrates an example of a method for a digitally autographed E-book or other electronic media delivery at a later time.

In the example of FIG. 3, the system and method adds an author's personalization to an E-book already downloaded to the reader or storage device 4. The Function Component 6 works to update the E-book with the author's personalization at a time later than the purchase of the E-book, by pushing a personalized replacement copy of the E-book onto the reader or storage device 4.

In one example, the registry maintains metadata and event data that helps to authenticate personalizations. For example, registry fields may include the personalization, the registry #, type of device, video record of the event, photographic record of the event, audio of a live feed of the event, date of event, location of event, event sponsor information, and the media. Author metadata can include the author's name, email address, date, time, location (i.e. itinerary) and internet service provider and/or URL, as well as login information. Purchaser information may include name, any customer identification assigned by the E-book distributor, email address, location, internet service provide and/or URL and/or unique device identifier. Publisher information may include media title, ISBN, edition and/or version number, publisher name, email address, genre, authenticating codes and the like. Distributor information may include distributor name, internet service provider and/or URL, transaction number, amount of the transaction, UCC coding and terms.

What is claimed is:

1. An electronic book personalization system comprising:
   electronic content that is an electronic book, the electronic content usable on a personal electronic device, the electronic content including a content file, wherein the personal electronic device is not a part of the system but is capable of accessing the system;
   a networked server comprising programming and capable of coupling with the personal electronic device; and
   a storage device, capable of storing images, audio, video, data or a combination thereof, being coupled with the networked server, wherein a personalized message, an image, a signature or any combination thereof is entered on the personal electronic device, directly on the personal electronic device or indirectly on the personal electronic device via another device capable of coupling with the personal electronic device, and
   wherein the personalized message, the image, the signature or any combination thereof is integrated into the electronic content, modifying the content file of the electronic content, by inserting the personalized message, the image, the signature or any combination thereof within the electronic content of the content file, wherein the modified content file includes the personalized message, the image, the signature or any combination thereof integrated into the content file, and not residing in a separate file, such that the electronic content is personalized;
   wherein the signature of a celebrity is entered by the celebrity either directly on the personal electronic device or indirectly on the another device of the celebrity, and the content file of the electronic content is modified, integrally including the signature of the celebrity in the content file;
   wherein the signature is automatically authenticated by the system, the system includes a verification system having look-up table capabilities for automatically authenticating the signature, consisting of a threshold range of at least ninety percent for timing and pressure that must match reference timing and pressure ranges during entry of the signature to automatically authenticate the signature, the look-up table automatically updates upon each successful authentication;
   wherein the verification system is configured to reject a signature not matching the threshold range and allow for a pre-determined number of additional attempts to match the threshold ranges; and
   wherein the electronic book personalization system is configured to deliver verified electronic content to an end user, the verified electronic content having viewable metadata including at least signor's name, date, time, and location of signing.

2. The electronic personalization system of claim 1, wherein the personalized message and the signature are entered directly on the personal electronic device of a reader by an author at a book signing.

3. The electronic personalization system of claim 2, wherein the personalized message and the signature are transmitted to the networked server and are stored on the storage device.

4. The electronic personalization system of claim 3, wherein additional data is stored on the storage device indicating the date when the personalized message and the signature are entered.

5. The electronic personalization system of claim 4, wherein the additional data stored on the storage device includes the location where the personalized message and the signature are entered.

6. The electronic personalization system of claim 1, wherein the celebrity is an author, and the personalized message and the signature are entered on the another device of the author at a book signing and the content file of the electronic content integrally including the personalized message and the signature is automatically transferred by the system to personalized electronic device, whereby the personalized electronic device is not a part of the system.

7. The electronic personalization system of claim 6, wherein the content file of the electronic content is stored by the system in the storage device.

8. The electronic personalization system of claim 7, wherein the system is capable of replacing the personalization and signature within the content file of the electronic content in case of loss.

9. The electronic personalization system of claim 6, wherein the personalized message and the signature is capable of being entered remotely at a virtual book signing, wherein a reader is capable of remote communication with the author, and the system automatically transfers a personalized copy of the content file of the electronic content to the reader's personal electronic device using the networked server electronically coupled to the reader's personal electronic device, whereby the reader's personal electronic device is not a part of the system.

10. The electronic personalization system of claim 9, wherein the system pushes the personalized copy of the content file.

11. The electronic personalization system of claim 10, wherein the personalized copy of the content file replaces a copy of the content file on the reader's personal electronic device.

12. The electronic personalization system of claim 1, wherein the personalized message, the image, the signature or any combination thereof is entered on the personal electronic device capable of coupling with the personal electronic device.

13. The electronic personalization system of claim 12, wherein another device is remote, from the personal electronic device, and the system automatically transfers a personalized copy of the content file of the electronic content to the personal electronic device via the electronic personalization system.

14. The electronic personalization system of claim 1, wherein the personalized copy is automatically transferred to the networked server, and the networked server transfers the personalized copy automatically to the personal electronic device.

15. The electronic personalization system of claim 1, wherein the content file includes the signature, and the signature is automatically authenticated by the system.

16. The electronic personalization system of claim 1, wherein the personalized message, the image, the signature, or any combination thereof is automatically authenticated by the system.

17. The electronic personalization system of claim 16, wherein a biometric password is stored in a registry, and the system compares biometric data entered during personalization with the biometric password stored in the registry.

* * * * *